United States Patent
Conner, III et al.

(10) Patent No.: US 7,827,046 B2
(45) Date of Patent: Nov. 2, 2010

(54) PREMIUM TRANSITION FACTOR

(75) Inventors: William J. Conner, III, Hingham, MA (US); Geoffrey H. Arnold, Brookline, MA (US); Marlowe G. Leibensperger, South Boston, MA (US)

(73) Assignee: Plymouth Rock Assurance Corporation, Boston, MA (US)

( * ) Notice: Subject to any disclaimer, the term of this patent is extended or adjusted under 35 U.S.C. 154(b) by 1754 days.

(21) Appl. No.: 11/355,781

(22) Filed: Feb. 16, 2006

(65) Prior Publication Data

US 2007/0118411 A1 May 24, 2007

Related U.S. Application Data

(60) Provisional application No. 60/738,889, filed on Nov. 22, 2005.

(51) Int. Cl.
G06Q 40/00 (2006.01)

(52) U.S. Cl. .......................................................... 705/4

(58) Field of Classification Search ........... 99/331–333, 99/372–384, 385, 389–392, 444–450; 219/521–525, 219/401, 415
See application file for complete search history.

(56) References Cited

U.S. PATENT DOCUMENTS

| | | | | | |
|---|---|---|---|---|---|
| 3,694,623 | A | * | 9/1972 | Toyooka et al. | 219/200 |
| 3,737,624 | A | * | 6/1973 | Eilenberger | 219/525 |
| 3,934,332 | A | * | 1/1976 | Trunzo | 267/225 |
| 4,297,941 | A | * | 11/1981 | Gallina | 99/332 |
| 4,520,602 | A | * | 6/1985 | Miller | 52/171.3 |
| 5,138,938 | A | * | 8/1992 | McClean | 99/331 |
| 5,606,905 | A | * | 3/1997 | Boehm et al. | 99/375 |
| 6,016,741 | A | * | 1/2000 | Tsai et al. | 99/341 |
| 6,089,144 | A | * | 7/2000 | Garber et al. | 99/331 |
| 6,595,114 | B1 | * | 7/2003 | Endres et al. | 99/342 |

OTHER PUBLICATIONS

Amy S. Bouska, Exposure Bases Revisited, Proceedings, Nov. 15, 1989, vol. LXXVI, No. 145, Publisher: Casualty Actuarial Society, Published in: US.

Glenn A. Evans & Stanley K Miyao, Development of an Inflation Sensitive Exposure Base for Hospital Professional Liability Insurance, Inflation Implications for Property-Casualty Insurance, May 17, 1981, pp. 209-241, Publisher: Casualty Actuarial Society, Published in: US.

(Continued)

Primary Examiner—Alexander Kalinowski
Assistant Examiner—Bruce I Ebersman
(74) Attorney, Agent, or Firm—Mark S. Nowotarski (57) ABSTRACT

Auto insurance customers can be transitioned from an initial rating algorithm A to a subsequent algorithm B by phasing in the transition over a period of several years. The premium charged during the transition period is equal to the premium calculated under the rating algorithm B minus a premium adjustment. The premium adjustment is given by the difference between the premium according to algorithm B minus the legacy premium from algorithm A, said difference being multiplied by a rating transition factor. The rating transition factor may be a linearly decreasing function which has a value of 1 just before the transition period and a value of zero at the end of the transition period. The transition period may be in the range of 3 to 8 years long.

3 Claims, 8 Drawing Sheets

OTHER PUBLICATIONS

Schlesinger et al. "Consumer Information and Decisions to Switch Insurers", The Journal of Risk and Insurance, 1993.

Venter, Gary, "Credibility Theory for Dummmies" Non-Refereed Paper, *Actuarial Society Forum Casualty Actuarial Society*—Arlington, Virginia Winter, 2003.

"Risk Classification Statement of Principles", American Academy of Actuaries, Committee on Risk Classification , Jul. 14, 2000.

"Statement of Principles Regarding Property and Casualty Insurance Ratemaking", Adopted by the Board of Directors of the CAS May 1988.

* cited by examiner

PREMIUM TRANSITION FACTOR

CROSS REFERENCE TO RELATED APPLICATION

This application claims the benefit of the filing date of U.S. provisional patent application Ser. No. 60/738,889, filed Nov. 22, 2005, entitled "Premium Transition Factor". Said provisional application is incorporated herein by reference.

FIELD OF THE INVENTION

This invention is in the field of automobile insurance. This invention is more particularly in the field of algorithms for setting auto insurance rates.

BACKGROUND OF THE INVENTION

Automobile insurance premiums vary over time. The variations can be categorized as "normal" variations or "significant" variations. This invention seeks to mitigate at least one source of significant variations in an insured driver's automobile insurance rates so that said driver will be more satisfied with his or her insurance coverage.

Figure 1:
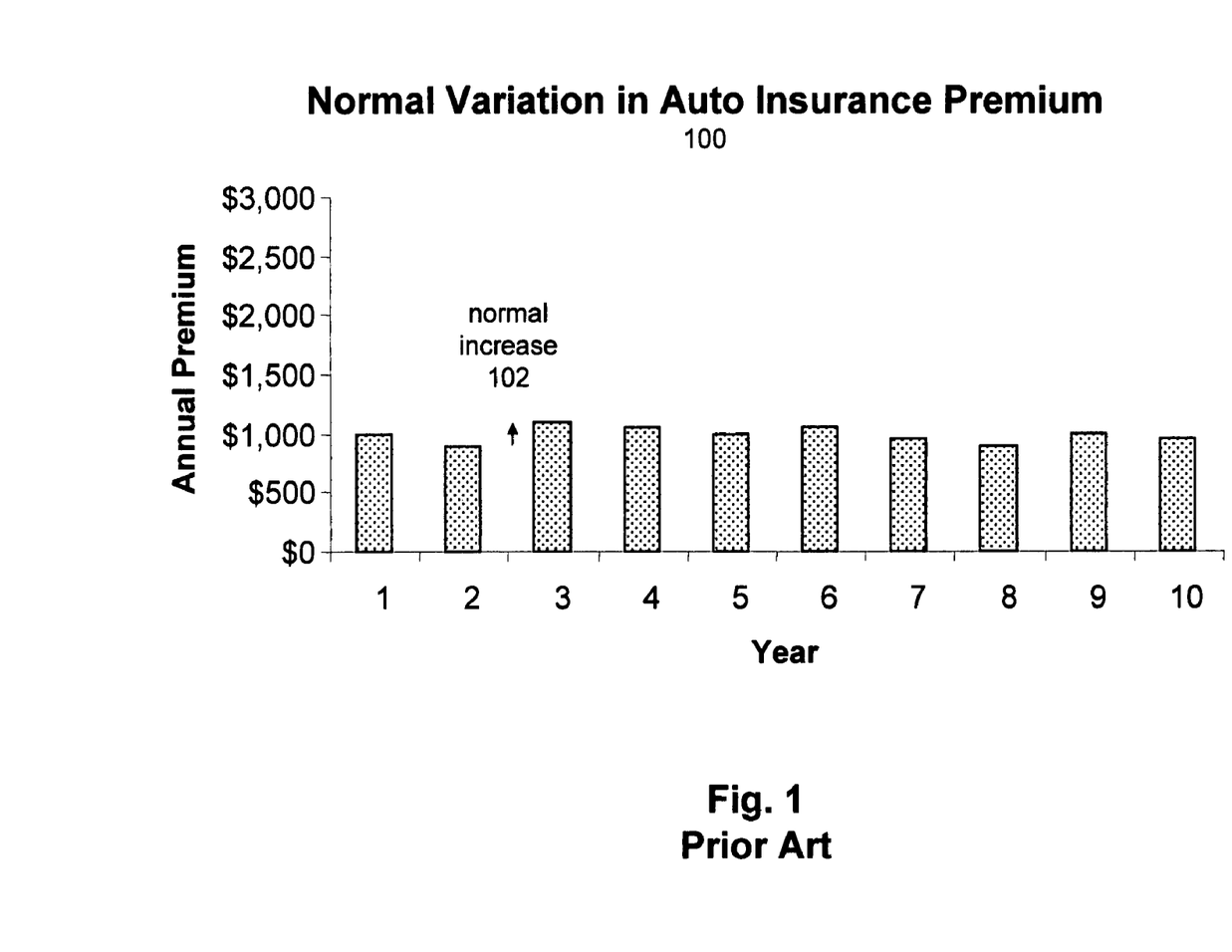
FIG. 1: Bar graph of normal variations of auto insurance premiums versus time.

FIG. 1 illustrates normal variations in auto insurance rates. FIG. 1 shows a bar graph 100 of the annual premiums for a given insured driver over a 10 year period. The premiums might go down in a given year due to such factors as the maturing of the driver, good driving record of the driver, or better financial performance by the insurance company providing the insurance.

Alternatively, the premiums might go up 102 in a given year due to such factors as poor driving record of the driver, overall inflation, and changes in the laws governing the types of losses that the insurance company must cover.

These factors may cause the premium to vary up to +/−20% and normally are not a cause of major concern for a typical driver.

Figure 2:
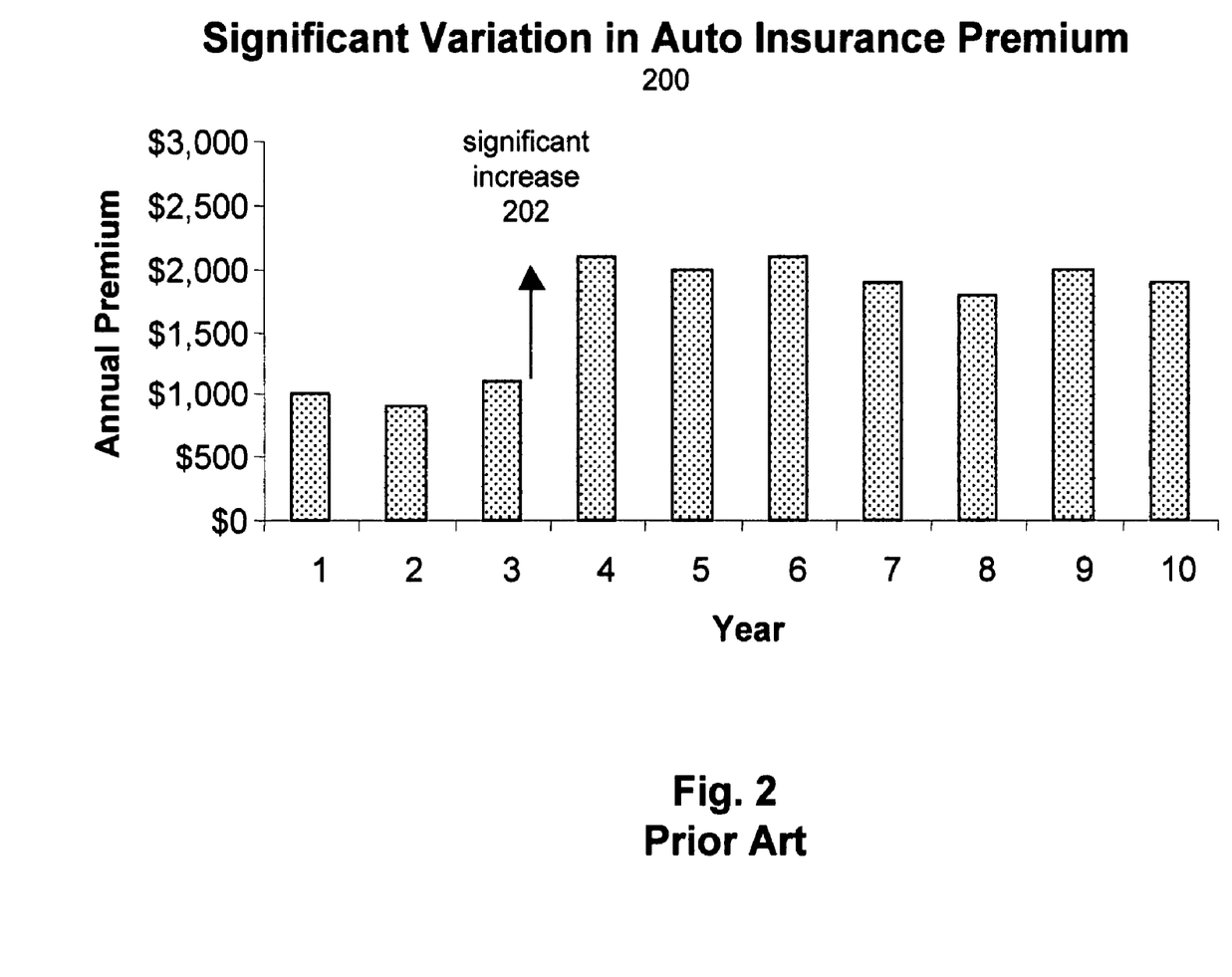
FIG. 2: Bar graph showing a significant variation in auto insurance premium.

FIG. 2 illustrates the occurrence of a significant variation in an insured driver's premiums. FIG. 2 shows a bar graph 200 of the annual premiums for a given insured driver over a 10 year period. In year 4, the driver had a significant increase 202 in premium.

A significant increase in premium can be due to such factors as adding a new driver to a policy, adding a new vehicle to a policy, or the insured driver moving to a "high loss" area. A high loss area might be an area that, for example, has a high auto theft rate or unusually high traffic density.

Insured drivers can also have significant decreases in premium. A significant decrease in premium can be due to such factors as removing an insured driver from an insurance policy, removing a vehicle from a policy and moving to a "low loss" area.

A change in premium is defined as significant if it is more than +/−20%.

A significant change in premium may alternatively be defined as when the change is more than twice what an insured driver normally experiences. For example, if a given insured driver normally sees year-to-year premium variations of only +/−5%, then a change of +/−10% would be considered significant.

A significant increase in premium will be noticed by an insured driver and can cause said insured driver to take action. The action might include shopping for a new insurance company or registering a complaint with said insured driver's state insurance department.

If a large number of insured drivers experience a significant increase in premium at about the same time or for the same reason, they may organize and take political action to address said reason for their increase. This is particularly true if the rate increase appears to be arbitrary.

A rate increase may appear to be arbitrary if the rate increase cannot be associated with any change in status of a driver, such as the addition of a new driver to a policy.

All states within the United States have laws and regulations that are designed at least in part to protect insured drivers from significant but arbitrary increases in their premiums. These laws and regulations, however, can have unintended consequences which actually cause the significant increases they were designed to prevent.

For example, a given state may pass laws and regulations that limit how much an insurance company can raise premiums in a given year. This may be acceptable to most insurance companies doing business in the state, but for some, particularly those that experience high losses, it may not allow them to continue to do business in the state. Hence these companies will leave the state and the drivers who had been insured by them will then have to seek insurance coverage from one of the state's remaining insurance companies.

Unfortunately when a large number of insured drivers have to switch from one insurance company to another, the act of switching will cause at least some of the drivers to experience a significant rate increase. This increase may appear to be arbitrary to a given insured driver since it will be perceived to be unrelated to any identifiable risk factor associated with said driver, such as whether or not said driver is a "good driver" or a "bad driver". At least some of the drivers for whom said rate increase appears arbitrary may become irate, shop for new insurance companies, and/or lodge complaints with their insurance department.

Hence there is a long-felt need for a method of helping drivers switch from one insurance company to another without a large fraction of said drivers being subjected to significant but seemingly arbitrary increases in their insurance premiums.

SUMMARY OF THE INVENTION

The Summary of the Invention is provided as a guide to understanding the invention. It does not necessarily describe the most generic embodiment of the invention or all species of the invention disclosed herein.

Most of the insured drivers within a given block of business can be protected from a significant but arbitrary increase in premium when they change from a first insurance company A to a second insurance company B if said second insurance company B "phases-in" the particular algorithm they use to determine the premiums for said insured drivers.

DESCRIPTION OF THE PREFERRED EMBODIMENT

The following detailed description discloses various embodiments and features of the invention. These embodiments and features are meant to be exemplary and not limiting.

In order to understand how the invention can provide for the gradual transition from the rating method of an insurance company A to the rating method of an insurance company B, it is first necessary to understand how automobile insurance rates are set.

Definitions

Auto insurance is a means by which at least some of the financial risks associated with operating an automobile are transferred from a driver to an insurance company. A driver that has auto insurance coverage is referred to as an "insured driver". "Financial risks" include things such as the cost of repairing a car, compensating an injured person after a collision or providing legal defense for an insured driver.

An insurance policy is a document that specifies the financial risks for which an insured driver is covered. It further specifies the conditions that must be met in order for the insurance coverage to be in force. One of these conditions is that the insured driver pays a premium.

The premium specified in an insurance policy is calculated by an insurance company using a "rating algorithm".

A rating algorithm uses data about an insured driver to calculate a premium. A premium can also be referred to as a "rate". The data used to calculate a premium can include, but is not limited to:

driver age
driver sex
accident history
traffic violation history
credit rating
marital status
home ownership
residence location A given insurance policy may only be in force for a certain period of time called a "term". Terms are commonly six months or twelve months. Some policies have monthly terms.

Within this Specification, terms will be presumed to be yearly. This is merely for the sake of simplicity of explanation. The methods disclosed herein are suitable for terms of any length.

Insurance policies can be extended for an additional term by being "renewed". An insurance company calculates a new premium for a subsequent term using their rating algorithm and updated information about the insured driver. Rating algorithms may calculate higher or lower premiums for subsequent terms due to changes in data about an insured.

The financial consequence that a driver suffers due to an accident is called a "loss". If the driver wants to be compensated for his or her loss by the insurance company, he or she submits a "claim". The money or other consideration that the insurance company provides to the insured driver to cover the claim is called a "benefit".

A measure of financial performance of an insurance company is its "loss ratio". A loss ratio is the ratio of the money paid out in benefits to the money paid in as premiums. If a loss ratio is 60%, for example, then, in a given term, the insurance company paid out 60 cents in benefits for every dollar in premium they collected. The 40 cents that the insurance company didn't pay out went to cover the additional expenses of providing the insurance. These additional expenses include the salaries of employees, the cost of goods and services, such as computers, and profit. In the US, a loss ratio of 60-70% is considered good in the sense that the insurance company will generally have enough money to cover the cost of their claims with enough left over to cover the cost of their operating expenses and provide a reasonable amount of profit. A loss ratio of greater than 70%, however, is considered bad in the sense that over the long term, an insurance company may not have enough revenue to cover its expenses or make a profit.

Auto insurance is commonly sold by "agents". Agents typically earn a commission when they sell a new insurance policy for a given insurance company. Agents may also earn a commission when they get a given driver to renew their policy with a given insurance company. The insured drivers who purchase from an agent are called "clients" of the agent. Agents may either represent one insurance company exclusively ("captive agents") or multiple insurance companies ("independent agents").

A group of insured drivers is called a "block of business". A given agent may have one or more blocks of business that they serve. Each of these blocks of business usually has its automobile insurance coverage provided by a single insurance company. A given agent may represent a multiplicity of insurance companies and hence may have clients in a multiplicity of blocks of businesses.

When a given insurance company "A" leaves a state, as discussed above, another insurance company "B" may negotiate with the agents of said insurance company A to have said company's agents recommend to their clients that said clients get their automobile insurance coverage from Company B. A given agent, therefore, may refer his or her clients in a given block of business formerly served by company A to new company B. Typically, no more than about 50% of the insured drivers in a given block of business will accept the agent's recommendation and will purchase their insurance coverage from company B. The fraction of drivers that accept the agent's recommendation and go with company B is called the "conversion ratio". A conversion ratio of 50% is typical. A conversion ratio greater than 60% is surprisingly good.

How Automobile Insurance Rates are Set

Figure 3:
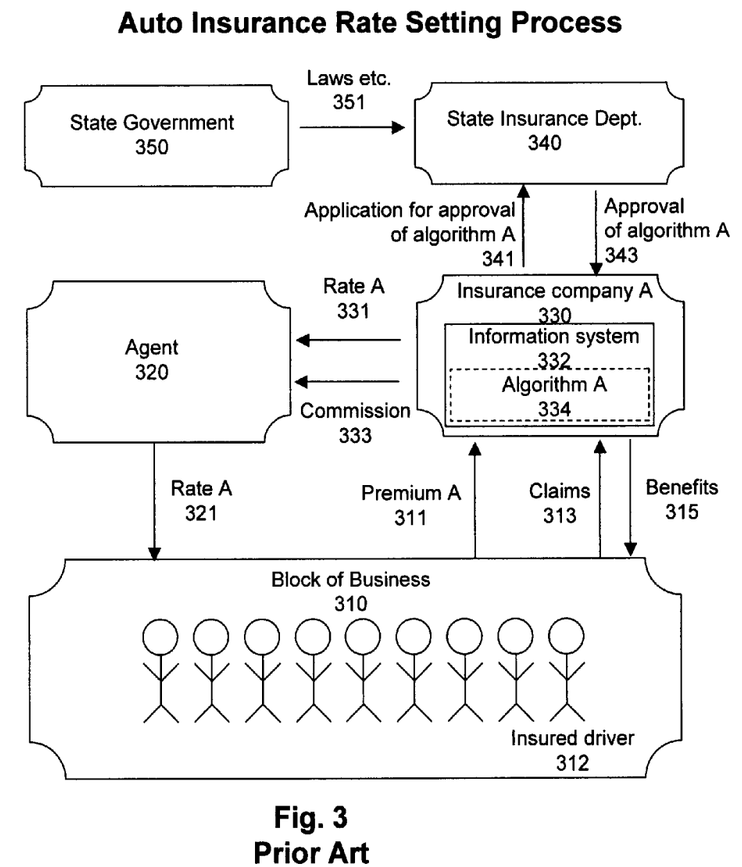
FIG. 3: Illustration of an auto insurance rate setting process.

FIG. 3 illustrates how automobile insurance rates are set. A given insurance agent 320 may represent a given insurance company A 330. The insurance agent may have one or more insured drivers 312 as his or her clients. The set of insured drivers served by the agent and covered by insurance company A is a block of business 310.

Before the end of a given term, insurance company A calculates the premiums that will be required of each of said insured drivers in said block of business in order for their automobile insurance coverage to be renewed for the subsequent term. The insurance company A uses a rating algorithm A 334 to calculate the premiums. The calculations are done at least in part on an information system 332. Said information system comprises one or more computers which read and write data to one or more databases and/or input/output devices (not shown).

The insurance company A then forwards 331 the new rates A either to the agent 320 who then forwards 321 them to the insured drivers or the insurance company forwards the rates directly to the insured drivers with a copy being provided to the agent. The insured drivers then pay 311 their premiums, usually directly to the insurance company, and upon doing so, their insurance coverage is renewed for the subsequent term. The insurance company also forwards 333 a renewal commission to the agent.

During the course of a term, one or more drivers may be in one or more accidents. They will then submit 313 claims to the insurance company. The insurance company will then pay 315 the benefits owed to the drivers to cover, at least in part, the insured drivers' losses.

Government Approval of Rates, Rating Algorithms and Factors

In most jurisdictions within the United States rates are set by each insurance company and calculated by means of base rates, factors and a rating algorithm. A given rating algorithm takes various information about the driver and other information related to the risk of that driver having an accident and then calculates a rate for the driver. The rate is proportional to the probability of the driver being in one or more accidents during a given term ("accident frequency"). The rate is also proportional to the average covered losses arising from accidents ("accident severity"). Hence a driver with an anticipated high probability of having an accident will be charged at a higher rate than a driver with a low anticipated probability of having an accident.

Referring again to FIG. 3, before an insurance company can use a given rating algorithm in a given state, it must usually first submit 341 said rating algorithm to that state's Department of Insurance 340. Said insurance department then determines if the rating algorithm comports with the laws, regulations and legal precedents 351 of the state 350. If it does, then the state insurance department approves 343 the algorithm for use by the insurance company.

Once an insurance company's rating algorithm is approved by a state insurance department, the insurance company must use that algorithm. An insurance company cannot change the algorithm, nor deviate from it, without regulatory approval.

Rating algorithms are normally available for public inspection at a state's insurance department. Hence different insurance companies can learn what rating algorithms are being used by their competitors. It is common, therefore, for insurance companies to use at least portions of each other's algorithms. Larger insurance companies may develop their own algorithms since they have the resources to do so. Smaller companies with less resources may rely upon the algorithms developed by other companies or modify the algorithms of other companies to better meet the needs of the particular segment of the market they are targeting.

One might expect that the rates for a given driver calculated by different rating algorithms would be approximately the same. This is not necessarily the case, however. Drivers are categorized by a rating algorithm into different risk classes based on different risk factors, such as age, accident record and history of moving violations. The number of risk classes may be so large that the number of drivers in any given single risk class ("classification cell") may be very small. The number may be so small in some classification cells that it is impossible to independently determine if the rate calculated for that class is accurate. A given insurance company may have enough data to accurately estimate the overall accident rate for the insured drivers in a given block of business, but may not have enough data to accurately estimate the accident rate for a given classification cell within said block of business. Hence different rating algorithms may give comparable results for the overall accident rate of a given block of business, while at the same time giving very different estimations of the accident rates for the insured drivers in some of the less populated classification cells.

Additionally, two functionally similar algorithms can yield two very different rates for an identical risk. This is because different insurance companies may arrive at different estimates for the base rates and factors that parameterize the algorithms. Because the algorithms specify how to perform the calculations that combine base rates and factors to generate a final rate, differences in just one base rate or factor can result in many differences in the final rates that result from the application of the algorithms.

Figure 4:
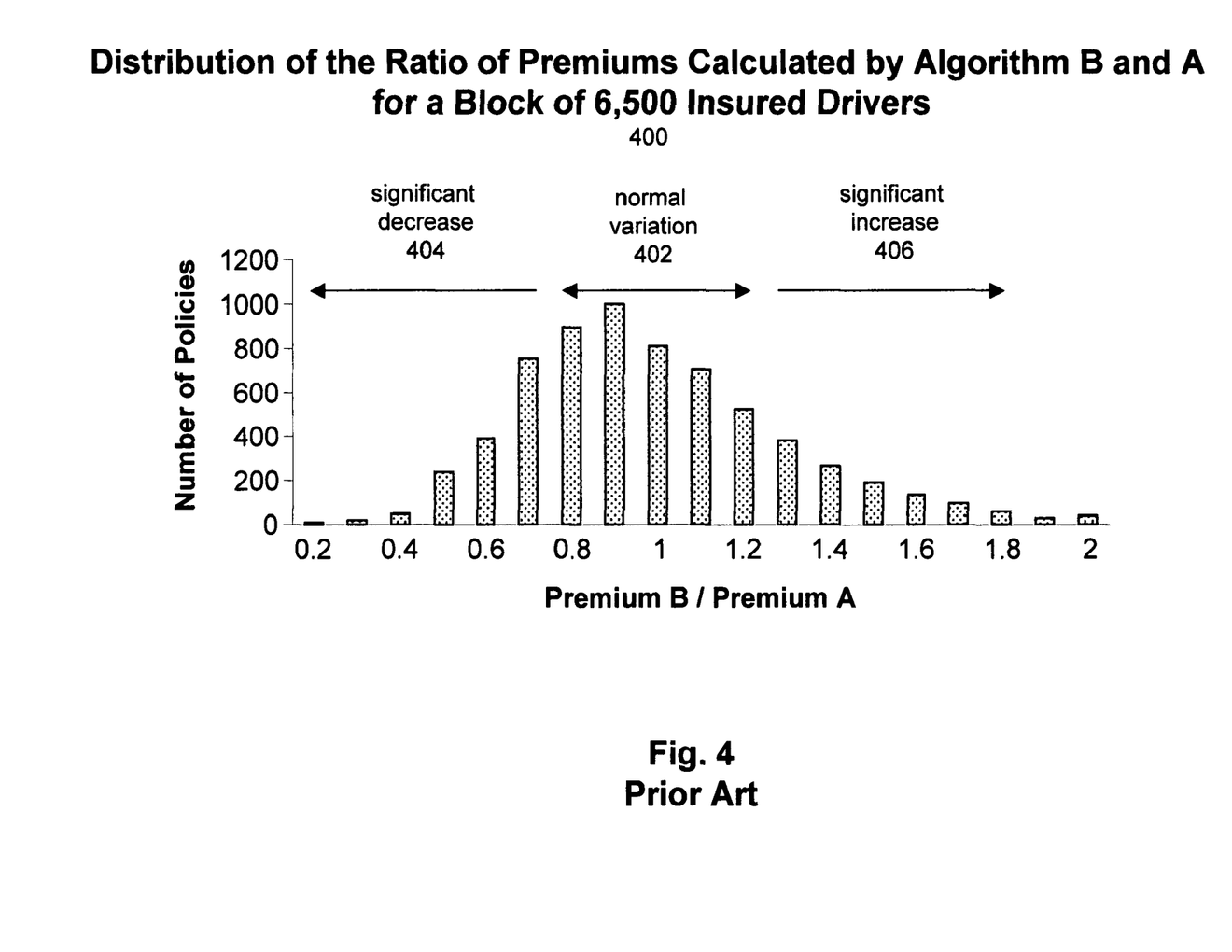
FIG. 4: Bar graph showing the distribution of the ratio of premiums calculated by two different rating algorithms.

FIG. 4 shows how the rates calculated by two different rating algorithms can be very different. FIG. 4 is a bar graph 400 of the number of policies (i.e. insured drivers) in a given block of business of 6500 drivers versus the ratio of the premiums calculated for said drivers by a rating algorithm B to the premiums for said drivers calculated for a rating algorithm A. Both of these algorithms had been approved by a given state insurance department as providing fair and equitable results consistent with the laws, regulations and legal precedents of the state, and yielding rates that are neither excessive nor inadequate.

The ratio shown in FIG. 4 has a value of 1 if both rating algorithms produce the same premium. The ratio is less than 1 if premium B is less than premium A. The ratio is greater than 1 if premium B is greater than premium A.

Each bar in FIG. 4 represents a range in premiums of about +/−5%. Hence 4 bars represent a range of normal variation 402. More than 4 bars represents a range of significant variation 404, 406.

If the set of drivers represented in FIG. 4 were to be suddenly switched from an insurance company A using rating algorithm A to an insurance company B using rating algorithm B, then a large fraction of the drivers would be subjected to a significant increase 406 in premium and a comparable number of drives would receive a significant decrease 404 in premium. Those that had a significant decrease might be very happy with their apparent windfall. Those that saw a significant increase, however, might immediately start shopping for another insurance company. The significant increase or decrease in premium would have nothing to do with how good or bad a given driver was. I might simply be an artifact of the fact that many drivers fall into classification cells where there are not enough drivers to independently assess their probability of loss or the value of a prospective loss.

Many of said drivers that were presented with said sudden significant increases in premiums will seek to find coverage from another carrier. Hence the block of business would shrink and the conversion ratio would be low.

Those that were presented with a sudden significant decrease in premium would most likely stay with said insurance company, but on average, they would not be paying enough premium. Hence the loss ratio for the remaining block of business would increase.

Experience has shown that when a block of business is affected by a sudden change in rate, the conversion ratios are about 50% and the loss ratios climb from about 60% before the conversion to over 80% shortly after the conversion. Thus, any insurance company seeking to take over a block of business from a given company leaving a given state must factor in low conversion rates and high loss ratios in their rating algorithms. The result of factoring in anticipated high loss ratios and low conversion rates is that the new insurance company may have to raise the average rates charged to the overall block of business.

Phased-in Rating Transition

Figure 5:
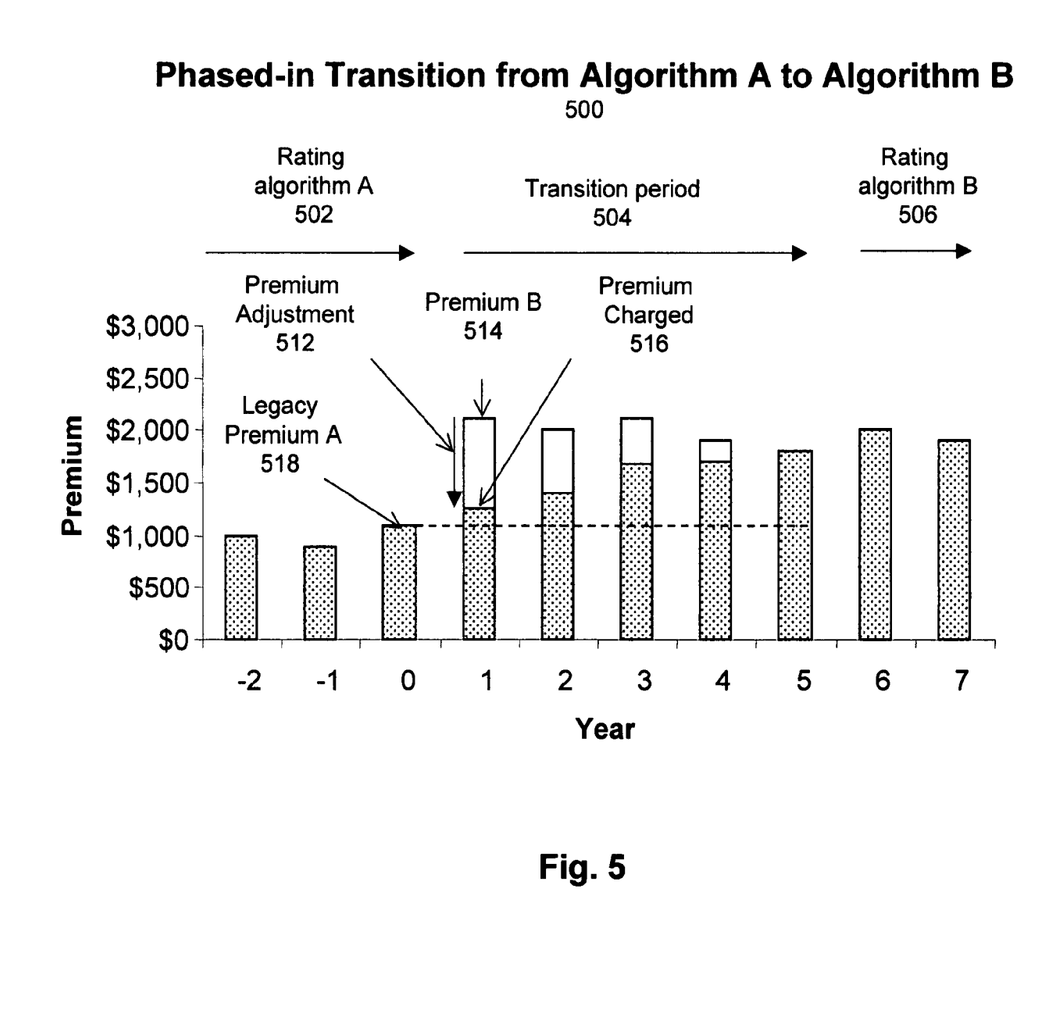
FIG. 5: Bar graph showing the phased-in transition from one rating algorithm to another during a transition period.

FIG. 5 illustrates a method according to the present invention for phasing-in the transition from an initial rating algorithm A to a subsequent rating algorithm B. FIG. 5 is a bar graph 500 which shows the premium that a given insured driver is charged versus time as they are switched from premiums calculated by algorithm A to premiums calculated by algorithm B.

During an initial time period 502 (i.e., years −2, −1, 0), said insured driver is charged a premium as calculated by an initial rating algorithm A. That premium undergoes year to year normal variations in the range of up to +/−20%.

During a transitional time period 504 (i.e., years 1, 2, 3, 4, 5), said insured's premiums are first calculated 514 according to a subsequent rating algorithm B, but then are adjusted 512 downward so that said insured does not experience an increase in premium greater than normal (e.g., <=20%). The gap 512 between the premium calculated 514 according to algorithm B and the actual premium 516 charged to the insured driver decreases over time until the difference is zero at the end of the transition period. The insured is then 506 charged premiums according to algorithm B.

When a transition period according to the above description is implemented, it has been found that conversion ratios of over 80% have been achieved with loss ratios of not more than 65%. Thus insurance company B did not have to increase overall premiums offered to the block of business in order to compensate for a low conversion ratio and increased loss ratio.

Premium Transition Factor

A suitable equation for calculating the premium that an insured driver is charged during a transition period is given by:

$$Pt_n = Pb_n - Tf_n * (Pb_n - Pa_o)$$

Where:
- $Pt_n$ is the premium charged to an insured driver during year (or term) n of a given transition period.
- $Pb_n$ is the premium calculated according to rating algorithm B for year (or term) n.
- $Tf_n$ is a premium "transition factor" calculated for year (or term) n. Said rating transition factor will be discussed in more detail below.
- $Pa_o$ is the last premium calculated for an insured driver using rating algorithm A. This is referred to as a "legacy premium" 518. It is the premium charged to the insured driver as of year 0.

The expression:

$$-Tf_n * (Pb_n - Pa_o)$$

is the amount 512 that the premium calculated according to algorithm B is adjusted by in each term n of the transition period.

Figure 6:
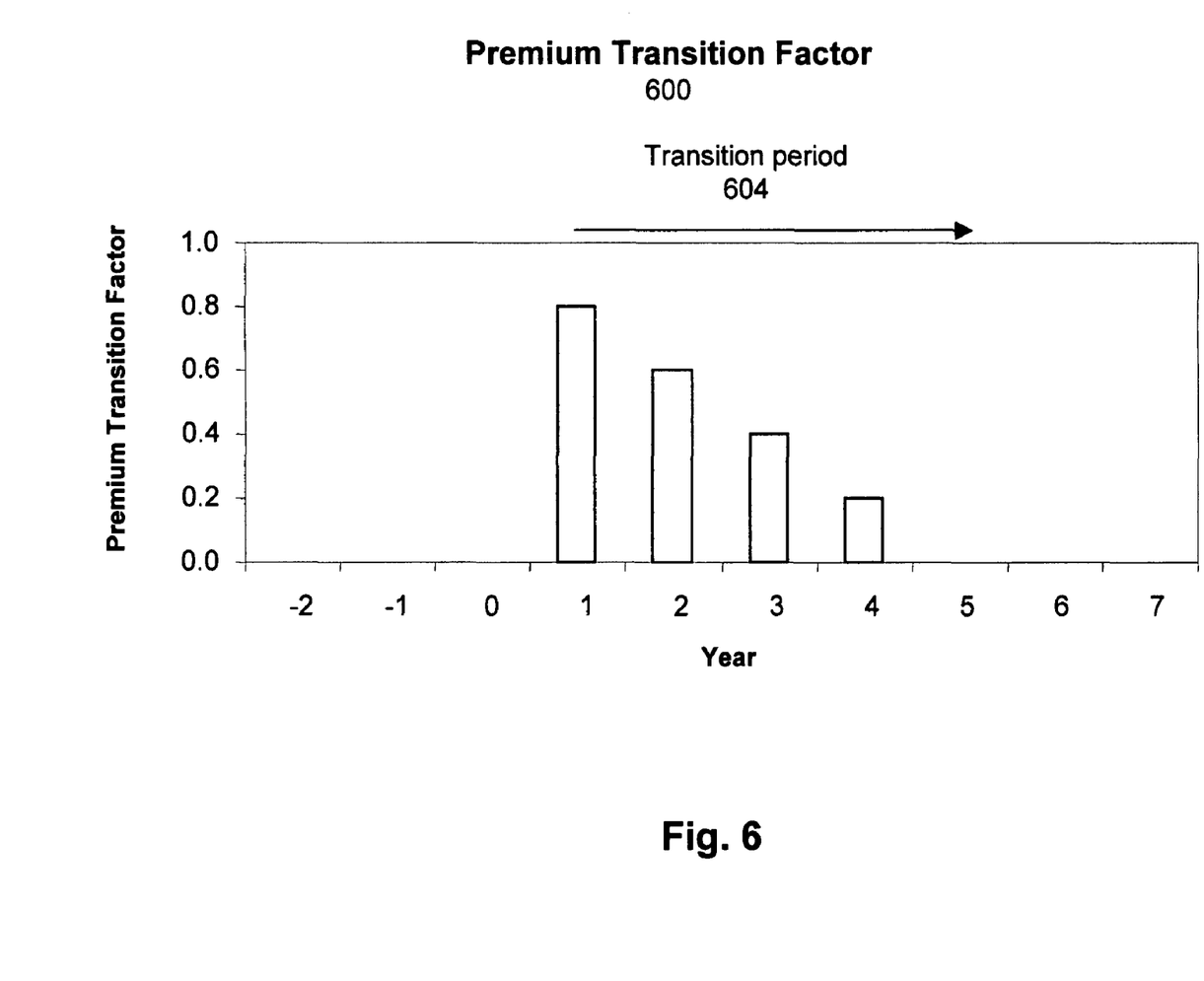
FIG. 6: Bar graph showing a premium transition factor varying during a transition period.

FIG. 6 is a bar graph 600 which illustrates how the premium transition factor, $Tf_n$, might vary over the course of a transition period 604. In this example, the transition factor decreases linearly over 5 years from an initial value of 0.8 in year 1 (or 1 in year 0) to a final value of 0 in year 5.

A preferred range of lengths for a transition period is 2 to 10 years. A more preferred range is 3 to 6 years.

A premium transition factor may be decreased to zero before the end of a transition period if the insured driver makes a significant change to his or her policy or has a significant change in risk factors that would cause an additional significant change in premium. The rationale for setting the transition factor to zero is that the driver would expect a significant change in their premium anyway and there is no longer any reason for shielding the driver from the earlier significant change due to the change in rating algorithm.

Alternatively, the premium transition factor may be increased before the end of a transition period. This might be done if for a given insured driver, the premium transition factor would cause said driver's premiums to change by more than a significant amount. For example, the premium transition factor may be adjusted so that the increase in a given driver's premiums is no greater than 15% in a given year.

Placing an upper limit on how much a given driver's premiums can increase in a given year may cause the driver to experience a significant increase in premium at the end of the transition period when the premium transition factor is set to zero. Nonetheless, the method still increases conversion ratios beyond what might be otherwise expected since a number of insured drivers may be more willing to accept a significant increase in premiums after they have had several years of positive experiences with the insurance company B.

It has been found, for example, that by limiting premium increases to 15% per year for two years and then setting the premium transition factor to zero in year three, a higher than expected number of drivers tolerate the significant increase in premium in year three than if the same premium increase were offered in year one.

In an alternative embodiment, the premium transition factor is selected such that at least a majority of the drivers in a given block of business see a normal change in premiums from one term to the next during the transition period. It is not necessary to select a transition factor such that no drivers experience a significant change in premium.

The invention is effective as long as the transition factor is chosen such that more drivers have a normal change in premium that would otherwise occur if there were no transition period.

Shape Parameter

Figure 7:
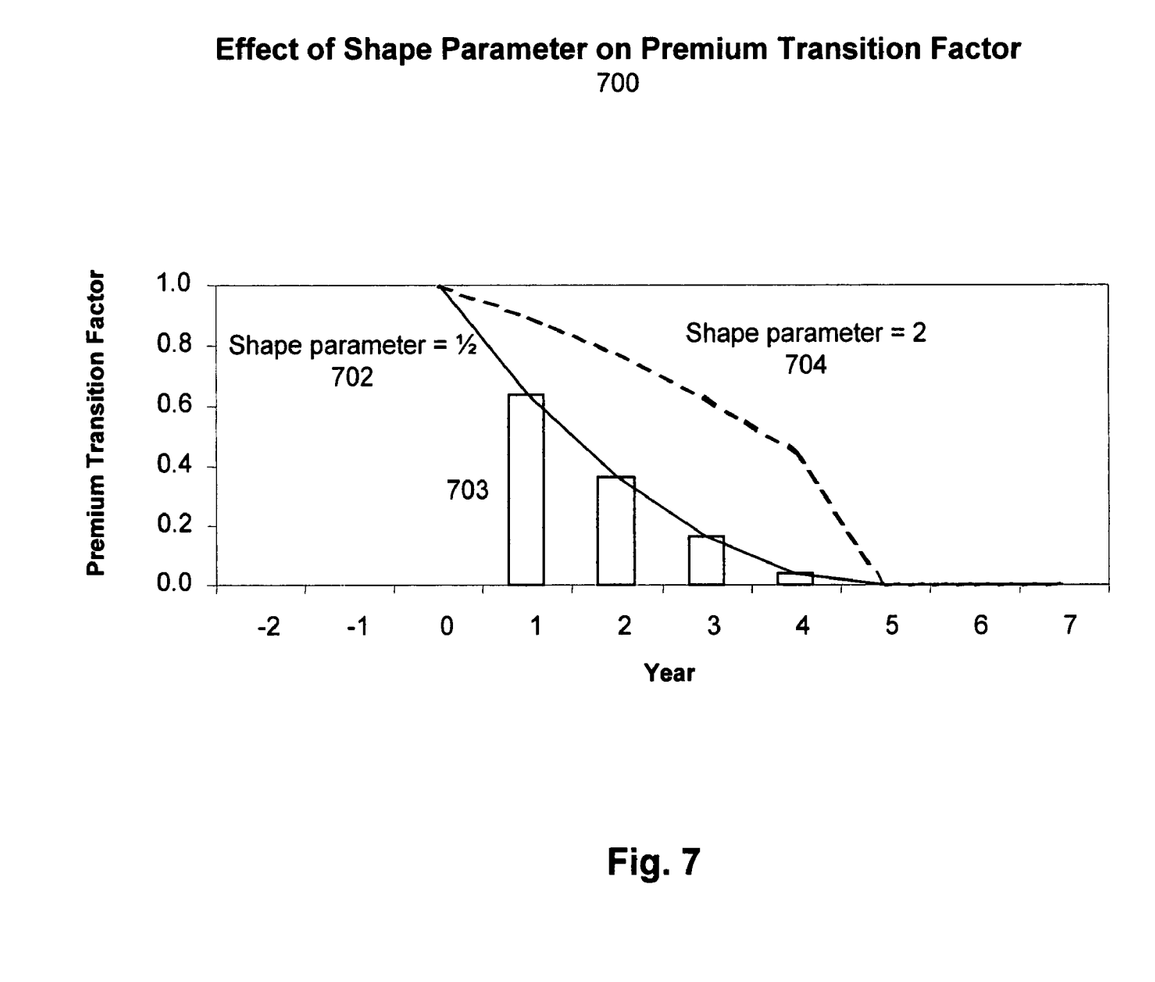
FIG. 7: Bar graph and line graphs showing the effects of a shape parameter on a premium transition factor varying during a transition period.

An alternative function for calculating a premium transition factor incorporates a shape parameter W. This function is illustrated in bar graph 700 of FIG. 7 and presented below:

$$Tf_n = \left(1 - \frac{n}{n_o}\right)^W$$

Where:
- $Tf_n$ is a premium transition factor.
- n is the nth year (or term) of a transition period.
- $n_o$ is the length of the transition period.
- W is a shape parameter.

When the shape parameter W is equal to 1, the premium transition factor decreases linearly over the length $n_o$ of a transition period. This linear decrease is shown in previously discussed FIG. 6.

Referring back to FIG. 7, when the shape parameter is less than one, the premium transition factor decreases initially quickly and subsequently more slowly. Curve 702 and its associated bars 703 show how the premium transition factor decreases when the shape parameter is ½.

On the other hand, when the shape parameter is greater than one, the premium transition factor initially decreases slowly and then decreases more quickly. Curve 704 shows how the premium transition factor decreases when the shape parameter is 2.

Phased-in Premium Decrease

Thus far, we have focused on the surprising benefits of phasing-in a premium increase that is mandated by a change in rating algorithm. There are, however, also surprising benefits to phasing-in the premium decreases also mandated by the same change in rating algorithm.

A sudden significant but arbitrary decrease in premium may be seen as suspicious by an insured driver. The insured driver may, for example, question whether or not the earlier premiums they had been paying to insurance company A were fair. Thus it is beneficial to phase-in premium decreases in much the same way as premium increases are phased-in.

Figure 8:
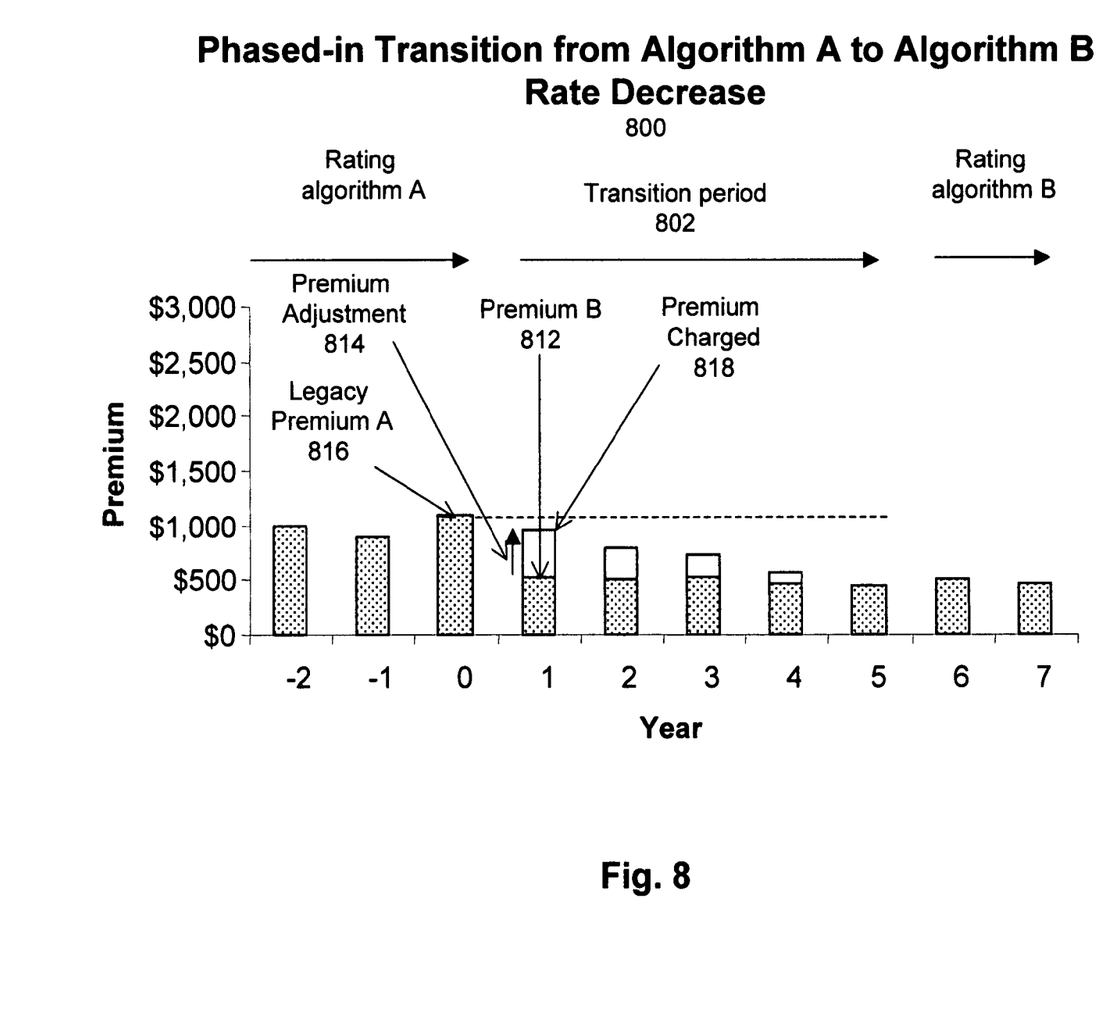
FIG. 8: Bar graph showing a phased-in transition from one rating algorithm to another when the second algorithm causes a significant decrease in premium during a transition period.

FIG. 8 is a bar graph 800 which illustrates how a significant premium decrease due to change in rating algorithms can be phased-in. The premium calculated 812 according to algorithm B is increased 814 by an amount dictated by the difference between the rating algorithm B premium 812 and the legacy premium 816. Said difference is multiplied by a transition factor to give the premium adjustment 814. The premium 818 that is charged to the driver is less than what they were paying before, but not overly so. The premium continues to decrease over the transition period 802 until it is the same as the premium calculated according to rating algorithm B.

When all of the premiums in a block of business are phased-in using the same transition factors as described herein, then overall premium income is maintained, loss ratios remain low and conversion ratios are high.

There may be advantages to using different shape factors for premiums that will increase versus premiums that will decrease. An insurance company may use a shape factor that is less than 1.0 for insured drivers that are due for a premium increase and a shape factor greater than 1.0 for insured drivers that are due for a premium decrease. The net effect is to help further reduce the loss ratio for a given block of business during a transition period.

Alternatively, an insurance company may use a shape factor that is greater than 1.0 for insured drivers that are due for a premium increase and a shape factor less than 1.0 for insured drivers that are due for a premium decrease. The net effect is to help further increase the conversion ratio for a given block of business during a transition period.

There are also surprising advantages to adjusting the shape factor and length of a transition period such that most insured drivers due for a rate increase experience approximately constant percentage increases in their premiums for each term in said transition period.

Computer Implementation

The methods described herein for calculating premiums during a transition period can be implemented for a large number of drivers using computerized means of data Each driver has one or more data records comprising data fields associated them his or her policy. These data records comprise the data required to calculate the premium for a given driver for a given term of auto insurance coverage. In order to implement the method, data elements for the legacy premium and transition year are assigned to each driver. These data elements are used in the equations described above to calculate the adjustments to the premiums for each driver during a transition period.

Increased Competition

The present invention for transitioning a block of insureds from one rating algorithm to another can be used to increase competition within a given insurance market by lowering the barrier to entry for new competitors.

A major area where insurance companies compete is in the features of the service they provide. Many companies have developed improved capabilities for servicing their customers. These include mobile vans for processing claims, such as the Crashbusters® vehicles offered by Plymouth Rock Assurance Corporation of Boston, Mass.

Based on these improved service capabilities, a given regional insurance company may wish to expand into new territories. A suitable means for expansion is to recruit existing agents in a given territory to offer policies issued by said insurance company to blocks of business that are already serviced by incumbent insurance companies. By phasing in the rate transition from an incumbent insurance company to a new insurance company, conversion ratios are higher and more consumers can take advantage of the new company's superior service offerings.

Improved Rating Algorithms

The present invention can also be used to transition customers of a given insurance company from an obsolete rating algorithm to an improved one. As described above, there is significant room for improvement in current rating algorithms. If companies can transition their customers to improved algorithms without generating undue customer dissatisfaction, they will be more likely to invest in making said improvements.

Applicability to Other Forms of Insurance

The methods described herein may be suitable for other forms of insurance where rating algorithms may have to be changed from time to time. These other forms of insurance include health insurance, homeowner's insurance, life insurance and property/casualty insurance.

Conclusion

One of skill in the art will recognize that insurance is a pervasively regulated industry. One practicing the methods described and claimed herein will want to maintain compliance with all applicable local, state and federal regulations, to ensure that the insurance policy is properly presented to the insured, premiums are properly approved, underwriting properly occurs, all necessary regulatory approvals are in place, etc.

While particular embodiments of the present invention have been illustrated and described, it would be obvious to those skilled in the art that various other changes and modifications can be made without departing from the spirit and scope of the invention. Any of the aspects of the present invention found to offer advantages over the state of the art may be used separately or in any suitable combination to achieve some or all of the benefits of the invention disclosed herein.

What is claimed is:

1. A computer implemented method for transitioning a block of insureds from a first rating algorithm A to a second rating algorithm B, said block of insureds comprising one or more insured drivers, said method comprising:
   a) receiving by said computer a length of transition period $n_o$;
   b) calculating by said computer a premium for each one of said insured drivers, said premium being for a given term n during said transition period wherein said premium is greater than or equal to the premium $Pt_n$, given by the equation:

$$Pt_n = Pb_n - Tf_n * (Pb_n - Pa_o)$$

wherein;
   i. $Pb_n$ is the premium for term n of the transition period calculated by said algorithm B;
   ii. $Tf_n$ is a transition factor for term n; and
   iii. $Pa_o$ is the premium for term 0 of said transition period calculated by said algorithm A; and
   c) outputting said premium to an insurance agent offering said insurance to said insured driver wherein $Tf_n$ is chosen such that the change in said premium $Pt_n$ from the prior premium $Pt_{(n-1)}$ is a normal change in premium for the majority of said insured drivers and wherein said transition factor $Tf_n$ is given by the equation:

$$Tf_n = \left(1 - \frac{n}{n_o}\right)^W$$

where W is a shape parameter in the range of ½ to 2.

2. The method of claim 1 wherein said normal change in premium is less than 20% in magnitude.

3. The method of claim 1 wherein W is greater than or equal to 1.0 if $Pb_n$ is greater than $Pa_o$ and W is less than or equal to 1.0 if $Pb_n$ is less than or equal to $Pa_o$.

* * * * *